United States Patent [19]

Miyazaki

[11] 4,262,426
[45] Apr. 21, 1981

[54] MARKER ASSEMBLY FOR USE WITH A MICROSCOPE

[75] Inventor: Kensaku Miyazaki, Machida, Japan

[73] Assignee: Olympus Optical Company, Ltd., Tokyo, Japan

[21] Appl. No.: 27,610

[22] Filed: Apr. 5, 1979

[30] Foreign Application Priority Data

May 16, 1978 [JP] Japan .............................. 53/66033[U]
May 16, 1978 [JP] Japan .............................. 53/66034[U]

[51] Int. Cl.³ .............................................. B41K 1/00
[52] U.S. Cl. ........................................ 33/189; 101/333
[58] Field of Search ........................... 33/189; 101/333

[56] References Cited

U.S. PATENT DOCUMENTS

| | | | |
|---|---|---|---|
| 1,424,941 | 8/1922 | Pirwitz | 33/189 |
| 2,364,497 | 12/1944 | Wahnish et al. | 33/189 |
| 2,730,811 | 1/1956 | Gouldsmith, Jr. | 33/189 |
| 2,934,829 | 5/1960 | Bohn | 33/189 |
| 3,075,294 | 1/1963 | Strecker | 33/189 |
| 3,153,860 | 10/1964 | Sidlauskas | 33/189 |
| 4,070,967 | 1/1978 | Schlau et al. | 101/333 |

FOREIGN PATENT DOCUMENTS 52-31499  3/1977  Japan .

*Primary Examiner*—William D. Martin, Jr.
*Attorney, Agent, or Firm*—Weinstein & Sutton

[57] ABSTRACT

A marker assembly for microscope includes a mounting shaft on the free end of which is detachably connected a marking member having a marking piece. A support member defines a chamber within which to receive the shaft in a displaceable manner. The support member can be mounted on the outer periphery of an objective barrel of the microscope, and an operating rod secured to the shaft cooperates with a guide groove or slot to cause a movement of the shaft so that the marking piece may be moved to a marking position and/or inking position.

36 Claims, 11 Drawing Figures

MARKER ASSEMBLY FOR USE WITH A MICROSCOPE

BACKGROUND OF THE INVENTION

The invention relates to a marker assembly for use with a microscope which may be used to mark a particular area of a specimen which is placed under the microscope.

In the observation of specimens under the microscope, it is essential that a particular area of the specimen be marked in order to permit a subsequent repeated observation or more close examination, in particular when a number of specimens are observed in succession. The marking of specimens frequently takes place during the actual examination.

A selected area of the specimen can be marked by handwritten marking with a pen or by using a marker. A handwriting is enabled only when the objective lens of the microscope has an increased distance corresponding to a magnification of 10X or 20X, for example. Further, a handwritten marking requires a skill on the part of the user in order to achieve a desired accuracy. Still, a skilled operator may suffer from a failure or inaccuracy, and in any event requires an increased length of time to complete the marking. These disadvantages can be overcome by employing a marker assembly, one example of which is illustrated in FIG. 1.

Referring to FIG. 1, there is shown a marker 1 which is generally similar in configuration to an objective lens barrel of a microscope. It includes a barrel 4 having no objective lens disposed therein, and a marking member 5 which is mounted around the barrel 4 so as to be vertically movable. The top end of the barrel 4 is peripherally threaded as shown at 2 which may be engaged by a knob 3 for connection with a revolver mechanism of the microscope in juxtaposition with an adjacent objective lens. The lower end of the barrel 4 is formed with a flange 4a and the marking member 5 is fitted around barrel 4 from below.

The marking member 5 comprises a hollow cylindrical body which is open in its top and which is provided with a bottom, which is centrally formed with a ring-shaped, downwardly depending marking piece 5c. The top end of the marking member 5 is peripherally formed with threads 5a, which are engaged by a sleeve-shaped knob 6 having an open bottom. A coiled tension spring 8 is disposed around the barrel 4 in the space between the barrel 4 and marking member 5, and abuts against the top surface of the knob 6 and the flange 4a, thus normally urging the marking member 5 upward. The resulting movement is usually blocked by the abutment of a step 5b which is formed on the lower inner surface of the marking member 5 against the flange 4a.

In use, the marker 1 is initially mounted on the revolver in juxtaposition with an objective lens of the microscope. The objective lens is located directly above a specimen 7, and while viewing the eyepiece of the microscope to observe the specimen 7, a focussing and/or movement of the specimen 7 is performed until a desired area of the specimen 7 is located within the field of view. Then the revolver is turned to locate the marker 1 directly above the specimen 7, and the marking member 5 is moved down by manually operating the knob 6, whereupon the marking piece 5c which is previously inked is brought in abutment against the specimen 7 to mark a desired area thereon. When the knob 6 is then released, the resilience of spring 8 returns the marking member 5 to the position shown in FIG. 1, removing the marking piece 5c away from the specimen 7. If required, the revolver may be turned again to locate the objective lens directly above the specimen 7 in order to confirm the mark which is put on the specimen 7.

It will be noted that the objective lens will be closely spaced from the specimen 7 when it is focussed. Also, the marker is not always identical in size and configuration with the objective lens. These factors may cause the specimen 7 to be inadvertently moved by the objective lens or the marker 1 when turning the revolver in order to shift from the objective to the marker, thus causing the desired area of the specimen 7 to be moved out of view. Another disadvantage of the described arrangement is the fact that it requires a number of operational steps, including recognizing a desired area of the specimen 7 in the field of view of the objective lens, turning the revolver to locate the marker 1 directly above the specimen 7 and manually depressing the knob 6. If it is desired to confirm the mark which is put to the specimen 7, the revolver must be turned again to locate the objective lens directly above the specimen 7.

The marking member 5 is usually formed of a metal material, and hence it is necessary to ink the marking piece 5c with a brush prior to the marking operation. Such necessity represents a further drawback in the ease of operating the marker. In addition, the form of a mark put to the specimen is limited to a ring form which is aligned with the optical axis of the objective lens, and it has been impossible to choose other form of the marks freely.

SUMMARY OF THE INVENTION

It is a first object of the invention to eliminate the above disadvantages of the prior art by providing a marker assembly which can be directly mounted on an objective barrel of a microscope to enable a marking and a confirmation thereof without requiring the rotation of a revolver.

It is a second object of the invention to provide a marker assembly of the type described which can be automatically inked.

In accordance with the invention, there is provided a marker assembly which is directly mounted on the objective barrel of the microscope to permit a marking operation in a simple manner without turning the revolver, by merely depressing an operating rod. This avoids the need experienced with a conventional marker to rotate the revolver until the marker is located directly above the specimen, but the specimen can be marked while it is being observed. Also, the impression of the mark can be confirmed without requiring a turning of the revolver, thus avoiding the likelihood that the specimen may be inadvertently moved during the rotation of the revolver. To summarize, the specimen can be marked by a one-touch operation of depressing the operating rod, which automatically locates the marking member, effects a marking operation, and the operating rod may be released to move the marking member automatically out of the field of view of the microscope. In this manner, a marking operation can be performed in a simple and accurate manner, even by an unskilled operator.

The marker assembly of the invention preferably includes a guide groove or slot for moving a marking member to a marking position, and a coiled return spring which returns the marking member to its initial position. According to another aspect of the invention, the guide groove also includes an inking groove portion into which the operating rod may be moved. In this manner, a depression and an angular movement of the operating rod is all that is required to achieve an inking and a marking operation, thus dispensing with a brush which has been used to ink a marking piece. This greatly improves the maneuverability. Finally, the marking member is preferably threadably connected with the assembly so as to be interchangeable. This permits a freedom of choice of the form, size and position of the mark, and even a marking position may be chosen which is located out of the field of sight of the microscope.

DESCRIPTION OF PREFERRED EMBODIMENTS

Figure 1:
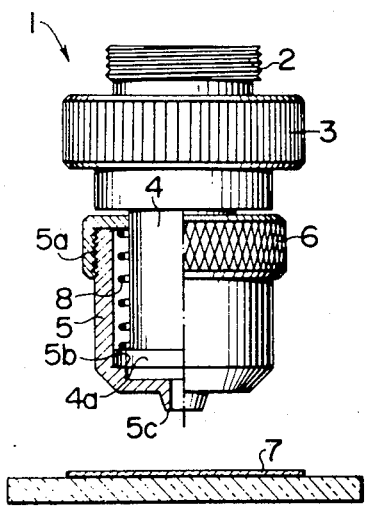
FIG. 1 is a front view, partly in section, of a conventional marker.
Figure 2:
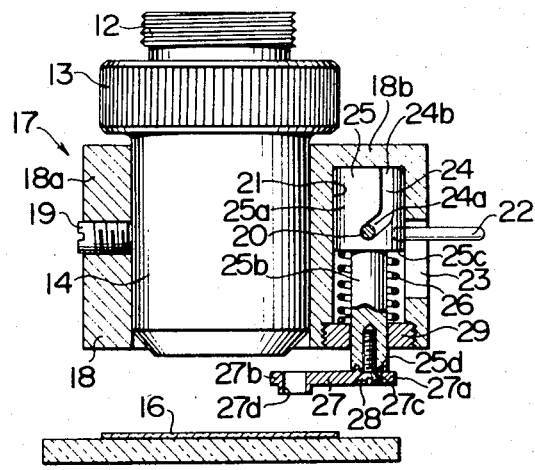
FIG. 2 is a front view, partly in section, of a marker assembly according to one embodiment of the invention.
Figure 3:
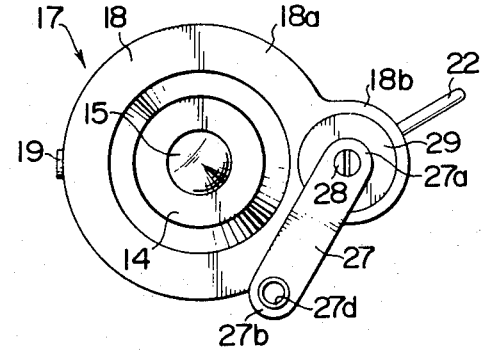
FIG. 3 is a bottom view of the marker assembly shown in FIG. 2.

Referring to FIG. 2, there is shown a marker assembly according to one embodiment of the invention. As shown, the marker assembly 17 is detachably mounted on an objective lens barrel 14 which is adapted to be connected with a revolver mechanism of a microscope. The barrel 14 internally houses an objective lens 15 (see FIG. 3), and the top end thereof is peripherally formed with threads 12 which are threadably engaged by knob 13 for connection with the revolver.

A marker assembly 17 comprises a cylindrical support 18a which is loosely fitted on the barrel 14 and is integrally connected therewith by set screw 19; a housing 18b which laterally projects from one side of the support 18a and forming a cylindrical chamber 21; a shaft 25 displaceably received within the chamber 21; a marking member 27 secured to the lower; free end of the shaft 25; an operating rod 22 which is used to move the shaft 25; and a coiled return spring 26 associated with the marking member 27.

The support 18a and the housing 18b constitute together a support member 18, and the housing 18b has an open bottom. The outer wall of the housing 18b is formed with a guide slot 23 communicating with the chamber 21. The guide slot 23 is formed by a longitudinally extending slot which includes an inclined top slot portion and through which the rod 22 extends for connection with the shaft 25. A projection 20 projects internally from the inner wall of the chamber 21 and engages a guide groove 24 in the form of a longitudinally extending flute 24b which is formed in the shaft 25 and having a lower inclined portion 24a.

The shaft 25 includes a top portion 25a of a greater diameter to which the rod 22 is secured, and a lower portion 25b of a reduced diameter which is concentric with the top portion 25a and downwardly depending therefrom. The top shaft portion 25a fits tightly in the chamber 21, but is both rotatable and vertically movable therein. A step 25c is formed between the two shaft portions 25a, 25b and represents an abutment against which bears one end of a coiled tension spring 26 disposed on the lower shaft portion 25b. The end face of the lower shaft portion 25b which extends downwardly out of the chamber 21 is formed with positioning openings 25d which fittingly receive positioning tabs 27c associated with a marking member 27. It will be noted from FIGS. 2 and 4 that the groove 24 includes a groove portion 24a which extends from the lower end thereof upwardly and obliquely to the right, and another groove portion 24b which continues with the groove portion 24a and extending vertically upward. It will be appreciated that the groove portion 24a is utilized to cause the shaft 25 to rotate and move vertically while the groove portion 24b is used to cause a vertical movement thereof.

Positioning tabs 27c are formed on one end 27a of the marking member 27, and when they are received in the positioning openings 25d formed in the end face of the lower shaft portion 25b, a set screw 28 is threadably engaged with a threaded opening (not shown) formed in the lower end face of the shaft portion 25b to secure the marking member 27 in position. Adjacent to the free end 27b, the marking member 27 is formed with a ring-shaped marking piece 27d which projects downwardly to present a ring-shaped lower end face which represents a marking surface. The arrangement is chosen such that the distance between the axis of the shaft 25 and the optical axis of the objective 15 is substantially equal to the distance between the axis of the shaft 25 and the center of the marking piece 27d.

The open bottom of the chamber 21 is closed by a cover plate 29 which is screwed thereto, the shaft 25 extending through the cover plate 29 is a rotatable manner. The other end of the spring 26 bears against the cover plate 29. Consequently, the resilience of spring 26 urges the shaft 25 upward, but the resulting movement is prevented by the abutment of the upper end of the shaft 25 against the inner top surface of the chamber 21.

Figure 4:
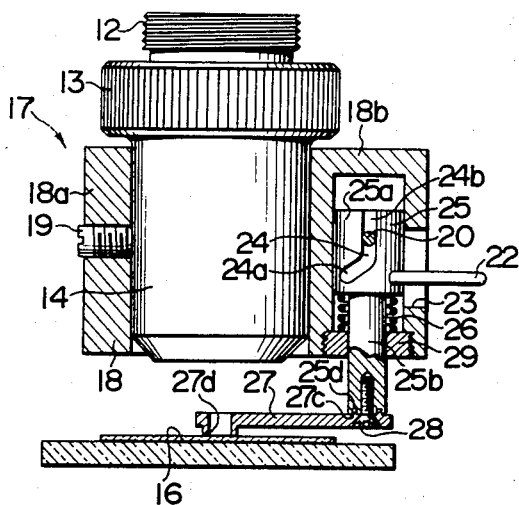
FIG. 4 is a front view, partly in section, of the marker assembly shown in FIG. 2 when it is located in its marking position.
Figure 5:
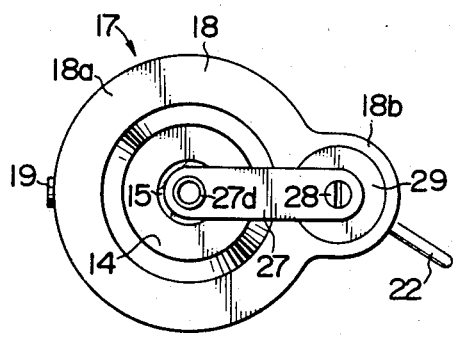
FIG. 5 is a bottom view of the marker assembly shown in FIG. 4.

In operation, when a specimen 16 is to be marked, the support 18a is mounted on the objective lens barrel 14 which is screwed onto a revolver, and secured thereto by set screw 19. The objective lens is then located directly above the specimen 16 by turning the revolver, and the lens is focussed while moving the specimen 16 as required so that a desired area to be observed can be located within the field of view. The operating rod 22 may then be depressed, whereupon the shaft 25 is guided by the cooperation between the projection 20 and groove portion 24a to move angularly in the clockwise direction, as viewed in FIG. 3, until the center of the marking piece 27d is substantially aligned with the optical axis of the objective lens. As the rod 22 is further depressed, the cooperation between the projection 20 and the groove portion 24b causes a vertically downward movement of the shaft, whereby the marking piece 27d is brought into abutment against the specimen 16 as illustrated in FIGS. 4 and 5, thus marking the latter. Subsequently when the rod 22 is released, the resilience of the spring 26 returns the shaft 25 to its initial position shown in FIG. 2, carrying the marking member 27 therewith, as a result of the cooperation between the projection 20 and groove 24.

Thus it will be seen that with the marker assembly of the invention, the specimen can be marked by a simple one-touch operation of the operating rod. It will be understood that in the embodiment shown in FIGS. 2–5, the marking piece 27d must be inked by using a brush. However, the embodiment shown in FIG. 6 avoids the need for a manual application of ink to the marking piece. The marker assembly shown in FIG. 6 is generally similar to the embodiment described above, and hence a repeated description thereof will be omitted by using the same reference characters for those components which are identical with those shown in FIGS. 2 to 5.

Figure 6:
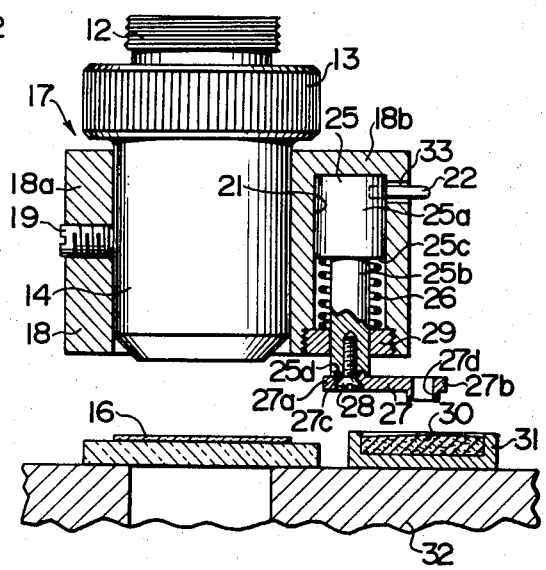
FIG. 6 is a front view, partly in section, of a marker assembly according to another embodiment of the invention.
Figure 10:
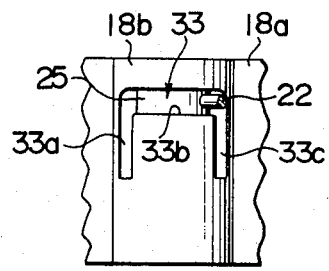
FIG. 10 is a front view of a guide slot associated with an operating rod which is used in the marker assembly of FIG. 6.

The principal difference between the marker assembly shown in FIG. 2 and that shown in FIG. 6 is the fact that in the embodiment shown in FIG. 2 the guide groove which is utilized to bring the marking member 27 to a desired marking position in response to an operation of the operating rod 22 is formed in the top shaft portion 25a and cooperates with projection 20 which projects internally from the inner wall of the chamber 21 while in the marker assembly 17 of FIG. 6, a guide slot 33 which serves the same purpose of bringing the marking piece 27d to a desired marking position is formed in the outer sidewall of the housing 18b in communication with the chamber 21. As shown in FIG. 10, the guide slot 33 has an inverted channel configuration, including a left-hand vertically extending slot portion 33a which is used during a marking operation, a horizontally extending slot portion 33b which communicates with the upper end of the slot portion 33a and which is used to cause a turning operation of the shaft, and a right-hand vertically extending slot portion 33c which is used during an inking operation. The operating rod 22 extends through the slot 33 and is secured to the shaft 25.

The marker assembly of FIG. 6 additionally includes an ink vessel 31 containing a pad 30 which is impregnated with an ink, and placed on a stage plate 34 of the microscope, at a position in vertical alignment with the marking piece 27d of the marking member 27 when the rod 22 is located within the inking slot portion 33c.

Figure 7:
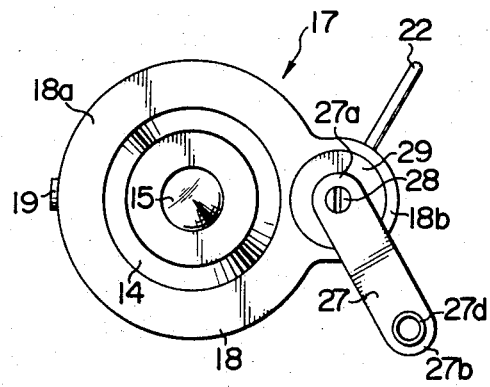
FIG. 7 is a bottom view of the marker assembly shown in FIG. 6.
Figure 8:
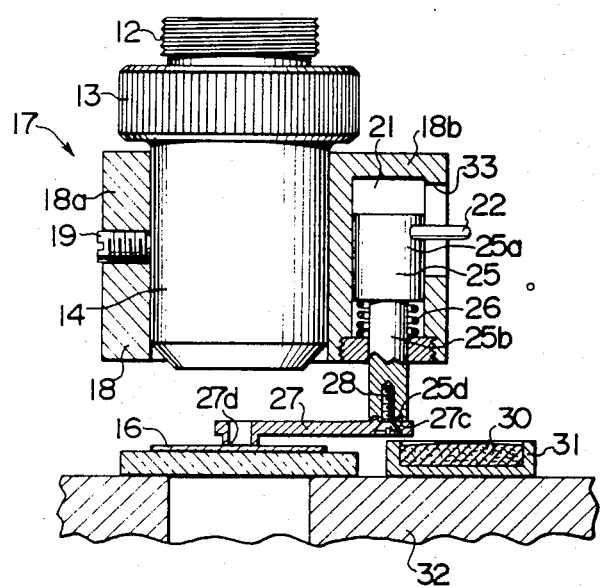
FIG. 8 is a front view, partly in section, of the marker assembly shown in FIG. 6 when it is located in its marking position.
Figure 9:
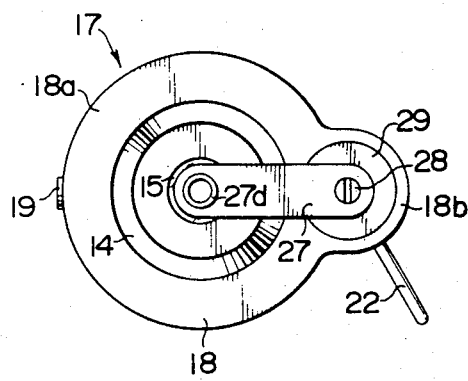
FIG. 9 is a bottom view of the marker assembly shown in FIG. 8.

In operation, when specimen 16 is to be marked, the support 18a of the marker assembly 17 is mounted on the objective lens barrel 14 which is screwed onto the revolver, and is secured thereto by set screw 19. The objective lens having the marker assembly 17 mounted thereon is then positioned directly above the specimen 16 by turning the revolver, and while viewing the eyepiece, the lens is focussed with the specimen 16 being moved as required in order to place a desired observation area thereof within the field of view of the lens. Subsequently, the operating rod 22 may be pushed down along the slot portion 33c, whereupon the marking member 27 moves down vertically from the position shown in FIG. 6 until the marking piece 27d is brought into contact with the pad 30 for purpose of inking. The rod 22 is then released to allow the marking member 27 to return to its position shown in FIG. 6 under the resilience of spring 26. The rod 22 is then angularly moved along the slot portion 33b in the clockwise direction, as viewed in FIG. 7, whereby the marking member 27 is angularly moved so that the center of the marking piece 27d is substantially aligned with the optical axis of the objective lens. Then the rod 22 is pushed down along the slot portion 33a to bring the marking piece 27d into abutment against the specimen 16 as shown in FIG. 8, thus marking the specimen. Thereafter, the rod 22 may be released to return the rod 22 upward along the slot portion 33a under the resilience of spring 26, accompanying a concurrent movement of the marking member 27 until the upper end of the shaft 25 bears against the top inner surface of the chamber 21. By turning the rod 22 along the horizontal slot portion 33b counterclockwise, as viewed in FIG. 9, the marking member 27 may be moved out of the field of view of the microscope, allowing a confirmation of a mark which is put to the specimen 16.

Figure 11:
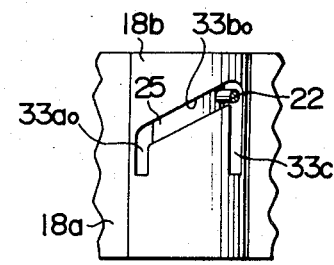
FIG. 11 is a front view of another form of guide slot.

Instead of the horizontal slot portion 33b shown in connection with the above embodiment, an obliquely extending slot portion $33b_o$ may be used as shown in FIG. 11 which extends from the top end of the slot portion 33c to a point on the slot portion 33a adjacent to the lower end thereof. In this instance, the left-hand slot portion $33a_o$ has a reduced length. This modification permits the operating rod 22 to be automatically returned to a position corresponding to the upper end of the slot portion 33c when it is released, by causing the resilience of spring 26 to move it upward along the slot portion $33a_o$ and then to move it angularly and upward along the slot portion $33b_o$. Obviously, the marking member 27 is automatically removed out of the field of sight of the microscope, and is located above the ink vessel 31.

In the embodiment described above, the marking piece has been described as being inked prior to each marking operation. However, by using a non-drying material for the marking piece, it becomes unnecessary to ink it for each marking operation. Also, the ink vessel may be designed in any manner which is capable of containing an amount of ink. By way of example, a stamp ink pad may be used.

Instead of using the operating rod to move the mounting shaft, a cable release such as is used in a photographic camera may be used to cooperate with the top end of the mounting shaft. Also the guide groove formed in the shaft and the projection extending from the inner wall of the chamber may be interchanged in position, namely, the projection may be formed on the shaft to cooperate with a guide groove formed in the wall of the chamber.

In each of the described embodiments, the configuration of the marking piece is not limited to a circular form, but rather may be replaced by a triangle, square, dot, or arrow mark, and the size of the mark may be chosen at will.

What is claimed is:

1. A marker assembly for a microscope which includes an objective lens barrel having a lens barrel axis, said marker assembly comprising:
   a support member for attachment to the objective lens barrel of the microscope;
   a marking piece; and
   mounting means for mounting said marking piece on said support member for angular movement about a mounting axis extending parallel to the lens barrel axis to move said marking piece in a direction towards the lens barrel axis to a marking position, and to move said marking piece in the opposite direction away from the lens barrel axis to a non-marking position.

2. The marker assembly of claim 1 wherein said marking position is within the field of view of the objective lens barrel and wherein said non-marking position is outside the field of view of the objective lens barrel.

3. The marker assembly of claim 2 wherein said support member is adapted to be detachably mounted on the objective lens barrel.

4. The marker assembly of claim 2 wherein said mounting means also mounts said marking piece for longitudinal movement in a direction parallel to said mounting axis as said marking piece moves between said marking position and said non-marking position.

5. The marker assembly of claim 4 wherein said mounting means comprises a mounting shaft having a first end to which said marking piece is connected and a second end mounted on said support member for movement between a first position and a second position, said mounting axis extending between said first end and said second end of said mounting shaft, and operating means associated with said mounting shaft for effecting said angular and longitudinal movements of said marking piece towards said marking position in response to movement of said mounting shaft towards said first position and for effecting said angular and longitudinal movements of said marking piece towards said non-marking position in response to movement of said mounting shaft towards said second position.

6. The marker assembly of claim 5 further including biasing means for biasing said mounting shaft towards said second position.

7. The marker assembly of claim 6 wherein said support member includes a chamber displaced from the objective lens barrel for receiving said second end of said mounting shaft for movement between said first and second positions.

8. The marker assembly of claim 7 wherein said operating means comprises a groove formed in said mounting shaft and a guide projection extending from the inner surface of said chamber and fitting in said groove, said groove and said guide projection cooperating with one another so that movement of said mounting shaft from said second position to said first position causes first an angular movement of said mounting shaft to move said marking piece to an intermediate position which is vertically alligned with said marking position and secondly, vertical downward movement of said shaft from said intermediate position to move said marking piece into said marking position to cause a marking operation.

9. The marker assembly of claim 8 further including an operating rod secured to said mounting shaft for moving said mounting shaft between said first position to said second position.

10. The marker assembly of claim 9 wherein said mounting shaft includes an upper portion of an increased diameter in which said groove is formed and to which said operating rod is secured, and a lower shaft portion of a reduced diameter concentric with said upper shaft portion and extending downwardly therefrom, and wherein said bias means comprises a coiled spring disposed on said lower shaft portion for automatically returning said marking member to said non-marking position.

11. The marker assembly of claim 8 wherein said groove includes an inclined groove portion for causing both an angular movement and a vertical movement of said mounting shaft as said mounting shaft is moved from said second position to said intermediate position and a vertically extending groove portion for causing a vertical movement of said mounting shaft as said mounting shaft is moved from said intermediate position to said first position.

12. The marker assembly of claim 7 wherein said operating means comprises a guide groove formed in the inner wall of said chamber and a projection extending from the peripheral surface of said mounting shaft and fitting in said guide groove, said guide groove and said projection cooperating with one another so that movement of said mounting shaft from said second position to said first position causes first an angular movement of said mounting shaft to move said marking piece to an intermediate position which is vertically aligned with said marking position and secondly, vertical downward movement of said shaft from said intermediate position to move said marking piece into said marking position to cause a marking operation.

13. The marker assembly of claim 12 wherein said guide groove comprises a slot extending through said support member, and wherein said projection extends through said slot beyond said support member.

14. The marker assembly of claim 1 further including inking means for inking said marking piece.

15. The marker assembly of claim 14 in which said microscope includes a stage plate and wherein said inking means comprises an inking vessel for placement on said stage plate, said inking vessel containing ink for inking said marking piece.

16. The marker assembly of claim 15 wherein said mounting means further mounts said marking piece for movement to an inking position displaced from said marking position.

17. The marker assembly of claim 16 wherein said mounting means mounts said marking piece for angular movement about said mounting axis to move said marking piece between said non-marking position and said inking position.

18. The marker assembly of claim 17 wherein said mounting means mounts said marking piece for angular movement between said marking position and said non-marking position and for angular movement between said non-marking position and said inking position.

19. The marker assembly of claim 18 wherein said mounting means also mount said marking piece for longitudinal movement in a direction parallel to said mounting axis as said marking piece moves between said marking position and said non-marking position and as said marking piece moves between said non-marking position and said inking position.

20. The marker assembly of claim 19 wherein said mounting means comprises a mounting shaft having a first end to which said marking piece is connected and a second end mounted on said support member for movement between a first position and a second position and between a second position and a third position, said mounting axis extending between said first end and said second end of said mounting shaft; and operating means responsive to movement of said mounting shaft between said first and second positions for effecting said angular and longitudinal movements of said marking piece between said marking position and said non-marking position, and responsive to movement of said mounting shaft between said second position and said third position for effecting said angular and longitudinal movements of said marking piece between said non-marking position and said inking position.

21. The marker assembly of claim 20 wherein said support means includes a chamber displaced from said objective lens barrel for receiving said second end of said mounting shaft for movement between said first, second and third positions, respectfully.

22. The marker assembly of claim 21 wherein said operating means comprises a guide groove formed in the wall of said chamber and a projection on said mounting shaft fitted in said guide groove, said guide groove and said projection cooperating with one another to effect movement of said marking piece between said marking position, said non-marking position and said inking position in response to movement of said mounting shaft between said first, second and third positions, respectfully.

23. The marker assembly of claim 22 wherein said guide groove includes a first groove portion having a first end and a second end, a second groove portion communicating with said first end of said first groove portion and a third groove portion communicating with said second end of said first groove portion, said projection being in said first groove portion when said mounting shaft is in said second portion, being in said second groove portion when said mounting shaft is in said first portion, and being in said third groove portion when said mounting shaft is in said third position.

24. The marker assembly of claim 23 wherein said first groove portion extends horizontally in the wall of said chamber and wherein said second and third groove portions extend vertically downward from said first and second ends respectively of said first groove portion.

25. The marker assembly of claim 23 wherein said first groove portion extends in a vertical oblique direction in the wall of said chamber with said second end of said first slot portion being vertically above said first end and wherein said second and third groove portions extend vertically downward from said first and second ends respectively of said first groove portion.

26. The marker assembly of claim 23 further including means for biasing said mounting shaft towards said second position in which said projection on said mounting shaft is in said first groove portion.

27. The marker assembly of claims 5 or 20 wherein said marking piece is detachably connected to said mounting shaft.

28. In combination, a microscope for observing a specimen, said microscope including an objective lens barrel having a lens barrel axis; and
a marker assembly for said microscope for placing a mark on the specimen to be observed with said microscoe, said marker assembly comprising:
a support member for attachment to said objective lens barrel of the microscope;
a marking piece; and
mounting means for mounting the marking piece on said support member for angular movement about a mounting axis extending parallel to the lens barrel axis to move said marking piece in a direction towards said lens barrel axis to a marking position, and for movement in the opposite direction away from said lens barrel axis to a non-marking position.

29. The combination of claim 28 wherein said marking position is within the field of view of the objective lens barrel and wherein said non-marking position is outside the field of view of the objective lens barrel.

30. The combination of claim 29 further including support member attachment means for detachably mounting said support member on said objective lens barrel.

31. The combination of claim 30 wherein said mounting means comprises a mounting shaft having a first end to which said marking piece is connected and a second end mounted on said support member for movement between a first position and a second position, and operating means associated with said mounting shaft for effecting movement of said marking piece towards said marking position in response to movement of said mounting shaft towards said first position and for effecting movement of said marking piece towards said non-marking position in response to movement of said mounting shaft towards said second position.

32. The combination of claim 28 wherein said marker assembly further includes inking means for inking said marking piece.

33. The combination of claim 32 wherein said microscope includes a stage plate and wherein said inking means comprises an inking vessel disposed on said stage plate and containing ink for inking said marking piece.

34. The combination of claim 33 wherein said mounting means further mounts said marking piece for movement to an inking position displaced from said marking position.

35. The combination of claim 34 wherein said mounting means mounts said marking piece for movement between said marking position and said non-marking position and for movement between said non-marking position and said inking position.

36. The combination of claim 35 wherein said mounting means comprises: a mounting shaft having a first end to which said marking piece is connected and a second end mounted on said support member for movement between a first position and a second position and between a second position and a third position; and operating means responsive to movement of said mounting shaft between said first and second positions for effecting movement of said marking piece between said marking position and said non-marking position, and responsive to movement of said mounting shaft between said second and third positions for effecting movement of said marking piece between said non-marking position and said inking position.

* * * * *

UNITED STATES PATENT AND TRADEMARK OFFICE
CERTIFICATE OF CORRECTION

PATENT NO. : 4,262,426
DATED : April 21, 1981
INVENTOR(S) : Kensaku Miyazaki

It is certified that error appears in the above—identified patent and that said Letters Patent is hereby corrected as shown below:

Column 1, line 18, change "handwritten marking" to --handwriting--.

Column 1, line 19, change "handwriting" to --handwritten marking--.

Column 8, line 3, change "wherein" to --in which--.

Column 9, line 11, change "respectfully" to --respectively--.

Column 9, line 21, change "respectfully" to --respectively--.

Column 9, line 57, change "microscoe" to --microscope--.

Signed and Sealed this

First Day of September 1981

[SEAL]

Attest:

Attesting Officer

GERALD J. MOSSINGHOFF

Commissioner of Patents and Trademarks